United States Patent

[11] 3,603,331

| [72] | Inventor | David E. Tanner<br>1551 Price Rd., Youngstown, Ohio 44509 |
|---|---|---|
| [21] | Appl. No. | 10,155 |
| [22] | Filed | Feb. 10, 1970 |
| [45] | Patented | Sept. 7, 1971 |

[54] ROTARY VALVE
5 Claims, 8 Drawing Figs.

[52] U.S. Cl. .................................................. 137/56,
123/73 V, 123/190 D
[51] Int. Cl. ..................................................... G05d 13/14,
F16k 3/03
[50] Field of Search ......................................... 123/190 D,
73 V; 137/56, 54; 73/551, 546, 535

[56] References Cited
UNITED STATES PATENTS

| 248,036 | 10/1881 | Gray | 137/56 |
| 2,685,440 | 8/1954 | Freeman | 73/551 X |
| 3,016,050 | 1/1962 | Soncini | 123/73 V |
| 3,535,982 | 10/1970 | Snider | 137/56 X |

*Primary Examiner*—Mark M. Newman
*Assistant Examiner*—R. B. Rothman
*Attorney*—Webster B. Harpman

ABSTRACT: A rotary valve for a two-cycle internal combustion engine comprises a pair of valve plates rotatably mounted on a hub structure which in turn is splined to a crankshaft of the engine so as to be revolved thereby. A ball movably caged in a radially positioned slot in an extension of the hub structure simultaneously engages oppositely disposed angularly disposed slots in the valve plates so that centrifugal force imparted the ball by spinning motion of the crankshaft will move the valve plates by reason of the engagement of the angular slots therein with the ball. Spring means are provided to bias the valve plates to one position and centrifugal force and the ball move the valve plates to a second position responsive to said spinning motion of the crankshaft.

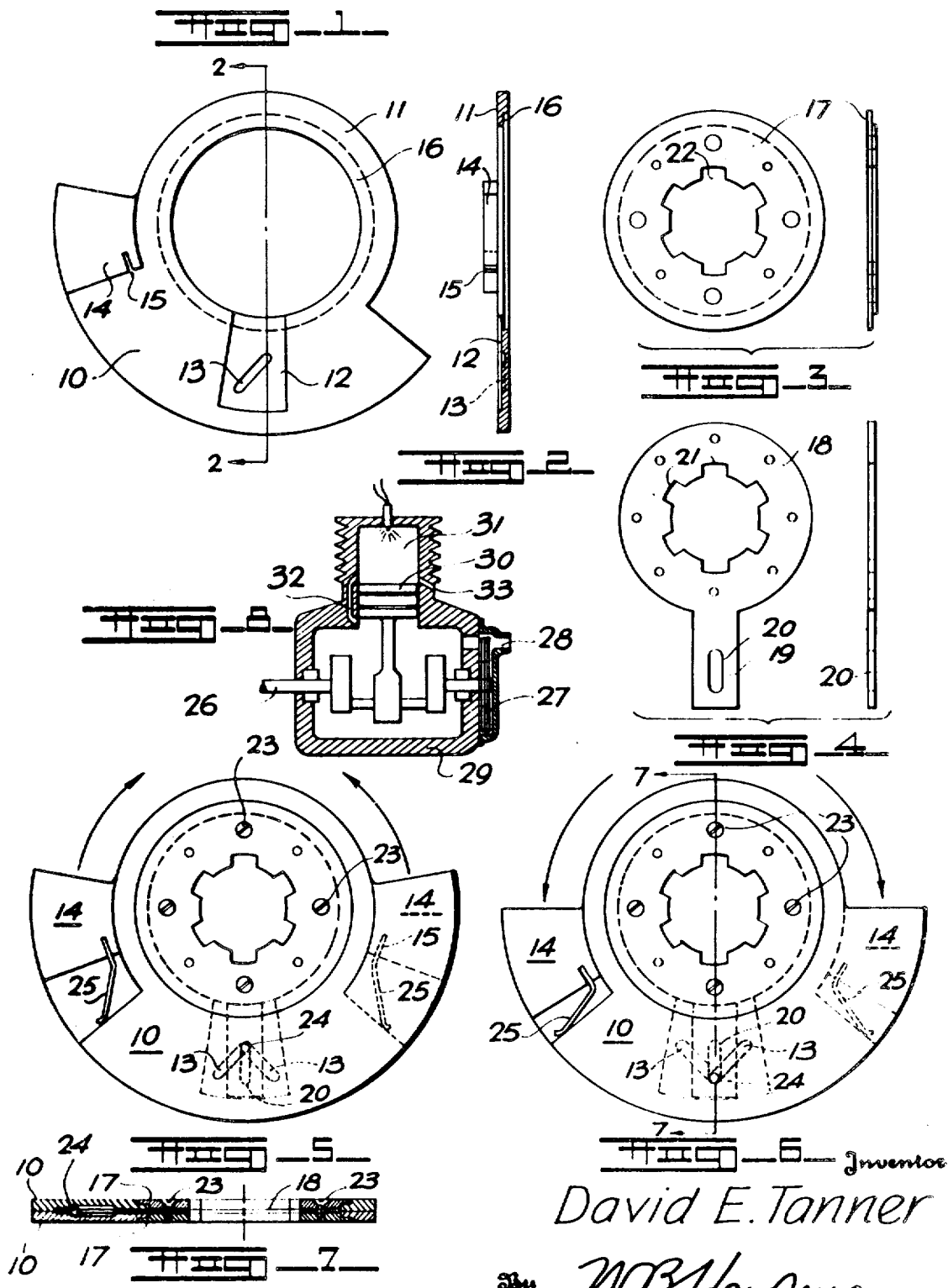

3,603,331

ROTARY VALVE

BACKGROUND OF THE INVENTION

1. Field of the invention

This invention relates to rotary valves as used in two-cycle internal combustion engines.

2. Description of the Prior Art

Prior rotary valves have opened and closed port passageways relative to their position while being rotated. The degree of opening achieved depended upon the formation of the rotary valve. This invention provides for a varying degree of opening of the rotary valve by forming the valve with two parts which are movable relative to one another so that in one position the two parts provide an opening of minimum size and in another position an opening of maximum size and the arrangement is such that the two parts of the valve vary in position with respect to one another depending upon the speed of rotation thereof.

SUMMARY OF THE INVENTION

A rotary valve comprising a pair of valve plates each of which has a cutaway portion thereon are arranged on a hub structure which in turn is splined to a rotating shaft such as a crankshaft. A radial extension of the hub structure has a radially extending slot therein and each of the valve plates has an angular slot therein arranged in oppositely disposed relation and so formed that all of the slots may be superimposed to cage a ball which is movable by centrifugal force so as to vary the relative position of the plates with respect to one another.

The arrangement is such that upon idling or low revolutions per minute the valve plates are moved relative to one another as by springs to the minimum opening valve size and when at peak revolutions per minute the valve plates move to the maximum open position. The variance in the degree of opening of the rotary valve contributes to the efficiency of the two-cycle internal combustion engine in which the valve is installed.

DESCRIPTION OF THE DRAWINGS

FIG. 1 is a plan view of a valve plate, two of which are used to form the rotary valve as disclosed herein.

FIG. 2 is a vertical section on line 2—2 of FIG. 1.

FIG. 3 is a composite view comprising a plan view on a side view of a bearing cap which forms part of a hub portion.

FIG. 4 is a composite view showing a plan and a side view of a cam guide which forms part of the hub structure of the rotary valve.

FIG. 5 is a plan view of the assembled rotary valve showing the plates thereof in position corresponding to idle and low revolutions per minute positioned.

FIG. 6 is a plan view of the rotary valve showing the plates thereof in position such as at peak revolutions per minute of the rotary valve.

FIG. 7 is a vertical section on line 7—7 of FIG. 6.

FIG. 8 is a schematic diagram of a two-cycle internal combustion engine employing the rotary valve.

DESCRIPTION OF THE PREFERRED EMBODIMENT

By referring to the drawings it will be observed that FIG. 1 discloses a valve plate 10 which has a central annular portion 11 and a radially extending flange thereon defining the plate 10. A substantially rectangular recess 12 is formed in the annular flange which defines the body of the plate 10 and a angularly disposed slot 13 is formed in the recess 12. A portion of the flange forming the body 10 is thickened to form a valve element 14 and an opening 15 extending thereinto provides for the reception of one end of a leaf spring as hereinafter disclosed.

In forming the rotary valve of the invention a pair of the valve plates 10 is positioned in abutment with one another with the valve portions 14 in oppositely disposed relation as seen in FIG. 5 of the drawings. There is an annular recess 16 around the opening in the central annular portion 11 as best seen in FIG. 2 of the drawings and a bearing cap 17 as seen in plan and side view in FIG. 3 of the drawings is disposed therein as best seen in FIGS. 5 and 6 of the drawings.

In the assembly of the rotary valve as seen in FIGS. 5, 6 and 7 of the drawings, a cam guide 18 having a radial extension 19 thereon is positioned between the plates 10. The radial extension 19 on the cam guide 18 is formed with a slot 20 positioned radially thereof and the central portion of the cam guide 18 is provided with a configuration of circumferentially spaced radially extending openings 21 which will register with splines on a shaft on which the valve is positioned, the shaft being for example a crankshaft in an internal combustion engine such as seen in FIG. 8 of the drawings.

In the assembled rotary valve as seen in FIGS. 5, 6 and 7 of the drawings, the two valve plates 10 are positioned in a movable manner on the two bearing caps 17 which are secured to one another by a plurality of countersunk screws 23 which also secure the cam guide 18 in position therebetween.

It will thus be seen that the two bearing caps 17 and the cam guide 18 form in effect a hub which is splined to the crankshaft of the internal combustion engine and therefore revolvable with the same and it will be seen that the valve plates 10 are positioned on this hublike structure comprised of the two bearing caps 17 and their intermediate cam guide 18 and arranged in oppositely disposed relation to one another as seen in FIGS. 5, 6 and 7 of the drawings so that the angular slots 13 therein are in partial registry with the radial slot 20 in the extension 19 of the cam guide 18. A ball such as a steel ball bearing 24 is positioned in the slot 19 in registry with the two angular slots 13 which are formed in the valve plates 10 and leaf springs 25 are positioned with their ends in the openings 15 in the valve portions 14 of the valve plates 10. When the rotary valve thus formed is standing still or is at idle or low revolutions per minute the relative positions of the valve plates 10 will be as seen in FIG. 5 of the drawings with the valve portions 14 moved away from the respective adjacent portions of the plates 10 by the leaf springs 25 and it will be seen that the arcuate area between the valve portions 14 is thus of minimum size being less than 180°.

By referring now to FIG. 6 of the drawings, it will be observed that when the rotary valve is spun as by the crankshaft of an internal combustion engine on which it is positioned, the ball 24 will move outwardly, radially of the cam guide 19 and as it is also partially caged by the angular slots 13, it will cause the valve plates 10 to move relative to one another to the positions illustrated in FIG. 6 wherein the open area of the rotary valve is now a full 180°.

By referring now to FIG. 8 of the drawings, it will be seen that a schematic diagram of a two-cycle internal combustion engine has been disclosed and that the crankshaft thereof is indicated by the numeral 26 and that the rotary valve as disclosed herein is indicated generally by the numeral 27. It is secured by its splined relation to the end of the crankshaft 26 and is rotated thereby and it functions in opening and closing an inlet air opening 28 with respect to the crankcase 29 of the internal combustion engine. A piston 30 is reciprocally mounted in a cylinder 31 and connected as customary to the crank section of the crankshaft 26. An inlet passageway 32 communicates between the crankcase 29 and the cylinder 31 when the piston 30 is in lower position and an exhaust passageway 33 is similarly provided.

Those skilled in the art will understand the operation of a two-cycle internal combustion engine and the operation of the rotary valve generally indicated at 27 in FIG. 8 with respect thereto. In the present invention, the rotary valve varies the amount of the opening as it is revolved by the crankshaft 26 and provides a desirable variance in the amount of the opening of the air inlet port 28 between an idling or low revolutions per minute position as seen in FIG. 5 of the drawings and a peak revolutions per minute position as seen in FIG. 6 of the drawings. The variable opening of the radial valve contributes to the smooth and satisfactory operation of the internal combustion engine so equipped as will occur to those skilled in the art.

Although but one embodiment of the present invention has been illustrated and described it will be apparent to those skilled in the art that various changes and modifications may be made therein without departing from the spirit of the invention and having thus described my invention,

What I claim is:

1. A rotary valve consisting of two valve plates having openings therein, a hublike structure, said valve plates movable around said hublike structure, a radially positioned slot in said hublike structure, angularly positioned oppositely disposed secondary slots in said valve plates, said slots crossing one another and a ball caged therein whereby rotary motion imparted said rotary valve will move said ball radially and impart opposite motion to said valve plates so as to change the positions of the openings therein relative to one another.

2. The rotary valve set forth in claim 1 and wherein said openings in said valve plates extend circumferentially thereof.

3. The rotary valve set forth in claim 1 and wherein a radial extension is formed on said hublike structure and said radially positioned slot is located in said extension.

4. The rotary valve set forth in claim 1 and wherein said hublike structure consists of a pair of circular bearing caps and an interposed cam guide and said radial slot is in said cam guide, and said hublike structure is splined for attachment to a shaft.

5. The rotary valve set forth in claim 1 and wherein springs are positioned between said valve plates and urge the valve plates toward a first position and said angularly disposed secondary slots are arranged so that motion imparted said valve plates by said ball is opposite to that of said springs.